United States Patent
Byun

(10) Patent No.: US 11,200,178 B2
(45) Date of Patent: Dec. 14, 2021

(54) APPARATUS AND METHOD FOR TRANSMITTING MAP DATA IN MEMORY SYSTEM

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/717,144

(22) Filed: Dec. 17, 2019

(65) Prior Publication Data

US 2020/0364157 A1    Nov. 19, 2020

(30) Foreign Application Priority Data

May 15, 2019  (KR) ........................ 10-2019-0056868

(51) Int. Cl.
*G06F 12/00* (2006.01)
*G06F 12/126* (2016.01)
*G06F 12/10* (2016.01)

(52) U.S. Cl.
CPC ............ *G06F 12/126* (2013.01); *G06F 12/10* (2013.01); *G06F 2212/657* (2013.01)

(58) Field of Classification Search
CPC ... G06F 12/126; G06F 12/10; G06F 2212/657
See application file for complete search history.

(56) References Cited

U.S. PATENT DOCUMENTS

| | | | |
|---|---|---|---|
| 5,740,465 A | 4/1998 | Matsunami et al. | |
| 6,553,511 B1 | 4/2003 | DeKoning et al. | |
| 6,996,676 B2 | 2/2006 | Megiddo et al. | |
| 7,549,034 B2 | 6/2009 | Foster, Sr. et al. | |
| 7,613,877 B2 | 11/2009 | Shimozono et al. | |
| 7,856,530 B1 | 12/2010 | Mu | |
| 8,972,957 B2 | 3/2015 | Bates et al. | |
| 9,003,126 B2 | 4/2015 | Cai et al. | |

(Continued)

FOREIGN PATENT DOCUMENTS

| | | | |
|---|---|---|---|
| KR | 10-2017-0006427 A | 1/2017 |
| KR | 10-2017-0081126 A | 7/2017 |

OTHER PUBLICATIONS

Cai Y, et al., Error characterization, mitigation, and recovery in flash-memory-based solid-state drives, Sep. 2017, pp. 1666-1704, vol. 105, Proceedings of the IEEE.

(Continued)

*Primary Examiner* — Prasith Thammavong
(74) *Attorney, Agent, or Firm* — IP & T Group LLP

(57) ABSTRACT

An operation method of a memory system includes: searching for a valid physical address in memory map segments stored in the memory system, based on a read request from a host, a logical address corresponding to the read requests, and a physical address corresponding to the logical address and performing a read operation corresponding to the read request; caching some of the memory map segments in the host as host map segments based on a read count threshold indicating the number of receptions of the read request for the logical address; and adjusting the read count threshold based on a miss count indicating the number of receptions of the read request with no physical address, and a provision count indicating the number of times the memory map segment is cached in the host.

20 Claims, 11 Drawing Sheets

| | H_SEG | RD_CNT |
|---|---|---|
| H_SEGMENT01 | 0 | 0 |
| H_SEGMENT02 | 1 | 1000 |
| H_SEGMENT03 | 0 | 20 |
| H_SEGMENT04 | 0 | 900 |
| ⋮ | ⋮ | ⋮ |

| | |
|---|---|
| RC_TH | 1000 |
| MISS_CNT | 1500 |
| PROVIDE_CNT | 10 |

198

(56) References Cited

U.S. PATENT DOCUMENTS

| | | |
|---|---|---|
| 9,104,599 B2 | 8/2015 | Atkisson et al. |
| 9,329,846 B1 | 5/2016 | August et al. |
| 9,378,135 B2 | 6/2016 | Bennett |
| 9,400,749 B1 | 7/2016 | Kuzmin et al. |
| 9,703,664 B1* | 7/2017 | Alshawabkeh ......... G06F 3/061 |
| 10,783,071 B2 | 9/2020 | Wang et al. |
| 2003/0041212 A1 | 2/2003 | Creta et al. |
| 2005/0102297 A1 | 5/2005 | Lloyd et al. |
| 2007/0118695 A1 | 5/2007 | Lowe et al. |
| 2007/0220201 A1 | 9/2007 | Gill et al. |
| 2009/0125548 A1* | 5/2009 | Moir ......................... G06F 9/52 |
| 2011/0093648 A1 | 4/2011 | Belluomini et al. |
| 2012/0096225 A1 | 4/2012 | Khawand et al. |
| 2012/0124294 A1* | 5/2012 | Atkisson ............... H04L 12/403 711/135 |
| 2013/0124794 A1 | 5/2013 | Bux et al. |
| 2013/0151777 A1* | 6/2013 | Daly ..................... G06F 12/126 711/122 |
| 2013/0151778 A1* | 6/2013 | Daly ................... G06F 12/0897 711/122 |
| 2013/0151780 A1* | 6/2013 | Daly ..................... G06F 12/121 711/122 |
| 2014/0047170 A1 | 2/2014 | Cohen et al. |
| 2014/0173234 A1 | 6/2014 | Jung et al. |
| 2014/0258638 A1 | 9/2014 | Traut et al. |
| 2015/0301744 A1 | 10/2015 | Kim et al. |
| 2015/0347028 A1 | 12/2015 | Kotte et al. |
| 2015/0356020 A1 | 12/2015 | Desai et al. |
| 2015/0378925 A1 | 12/2015 | Misra |
| 2016/0147654 A1* | 5/2016 | Zhao ..................... G06F 12/084 711/130 |
| 2016/0267018 A1* | 9/2016 | Shimizu ................ G06F 12/126 |
| 2016/0274797 A1 | 9/2016 | Hahn |
| 2016/0299715 A1 | 10/2016 | Hashimoto et al. |
| 2016/0378359 A1 | 12/2016 | Jang et al. |
| 2017/0060202 A1 | 3/2017 | Sundaram et al. |
| 2017/0109089 A1 | 4/2017 | Huang |
| 2017/0192902 A1 | 7/2017 | Hwang et al. |
| 2017/0351452 A1 | 12/2017 | Boyd et al. |
| 2018/0067678 A1 | 3/2018 | Jeong et al. |
| 2018/0088812 A1 | 3/2018 | Lee |
| 2018/0101477 A1* | 4/2018 | Kan ..................... G06F 12/0246 |
| 2019/0004591 A1* | 1/2019 | Park ....................... G06F 1/3225 |
| 2019/0004944 A1 | 1/2019 | Widder et al. |
| 2019/0042464 A1 | 2/2019 | Genshaft et al. |
| 2019/0171575 A1 | 6/2019 | Chen et al. |
| 2019/0265976 A1 | 8/2019 | Goryavskiy et al. |
| 2019/0272104 A1* | 9/2019 | Durnov .................. G06F 3/0673 |
| 2019/0294546 A1* | 9/2019 | Agarwal ............. G06F 12/0859 |
| 2020/0278797 A1 | 9/2020 | Bavishi |
| 2020/0327063 A1* | 10/2020 | Kang .................. G06F 13/1668 |
| 2020/0334138 A1* | 10/2020 | Byun ..................... G06F 3/0619 |
| 2020/0334166 A1* | 10/2020 | Byun ..................... G06F 1/3275 |

OTHER PUBLICATIONS

Differences between disk cache write-through and write-back, Huawei Enterprise Support Community, Jun. 6, 2016 <https://forum.huawei.com/enterprise/en/differences-between-disk-cache-write-through-and-write-back/thread/203781-891>.

Office action issued by the USPTO for U.S. Appl. No. 16/709,702 dated Apr. 6, 2021.

Office action issued by the USPTO for U.S. Appl. No. 16/842,416 dated May 3, 2021.

Office action issued by the USPTO for U.S. Appl. No. 16/844,652 dated Apr. 2, 2021.

Office Action issued by the USPTO for U.S. Appl. No. 16/837,764 dated Aug. 18, 2021.

Office Action issued by the USPTO for U.S. Appl. No. 16/837,727 dated Oct. 7, 2021.

Office Action issued by the USPTO for U.S. Appl. No. 16/709,702, dated Oct. 14, 2021.

* cited by examiner

FIG. 6A

| | H_SEG | RD_CNT |
|---|---|---|
| H_SEGMENT01 | 0 | 0 |
| H_SEGMENT02 | 1 | 1000 |
| H_SEGMENT03 | 0 | 20 |
| H_SEGMENT04 | 0 | 900 |
| ⋮ | ⋮ | ⋮ |

| | |
|---|---|
| RC_TH | 1000 |
| MISS_CNT | 1500 |
| PROVIDE_CNT | 10 |

FIG. 6B

| | H_SEG | RD_CNT | |
|---|---|---|---|
| H_SEGMENT01 | 0 | 10 | |
| H_SEGMENT02 | 1 | 900 | → REMOVE H_SEGMENT |
| H_SEGMENT03 | 0 | 19 | |
| H_SEGMENT04 | 0 | 1004 | → PROVIDE M_SEGMENT |
| ⋮ | ⋮ | ⋮ | |

| | |
|---|---|
| RC_TH | 1000 |
| MISS_CNT | 300 |
| PROVIDE_CNT | 1 |

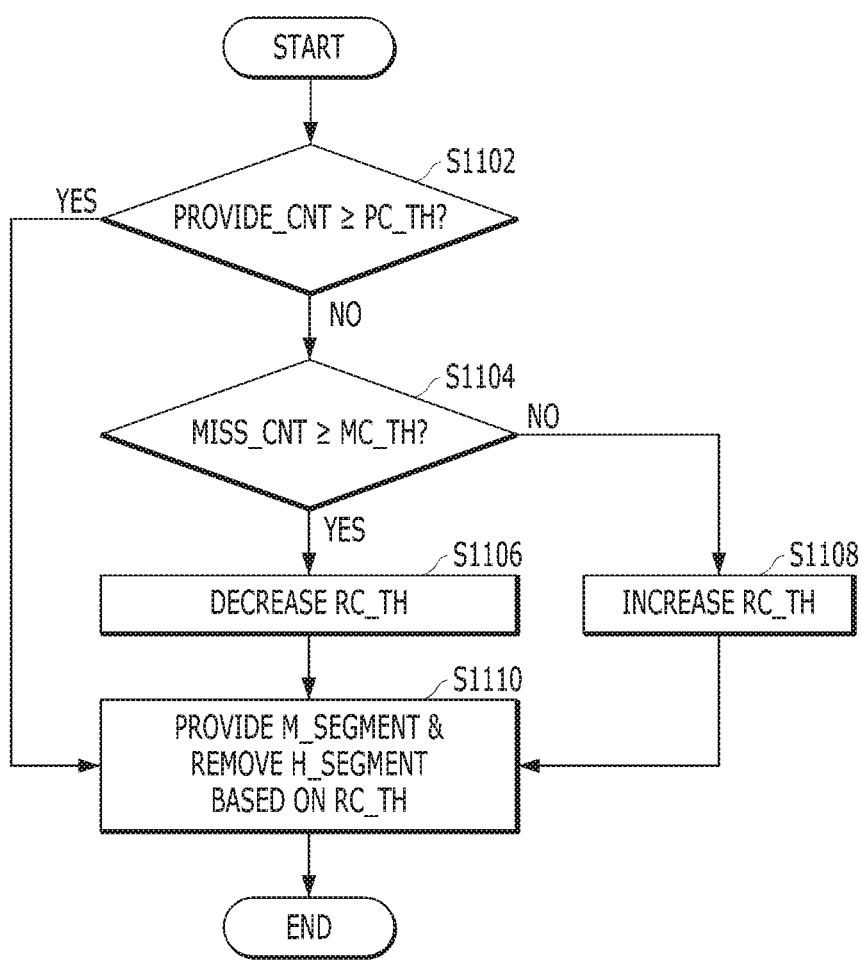

APPARATUS AND METHOD FOR TRANSMITTING MAP DATA IN MEMORY SYSTEM

CROSS-REFERENCE TO RELATED APPLICATION

This application claims priority under 35 U.S.C. § 119 to Korean Patent Application No. 10-2019-0056868, filed on May 15, 2019, which is incorporated herein by reference in its entirety.

BACKGROUND

1. Field

Various embodiments relate to a memory system, and more particularly, to an apparatus and a method of operating a memory system to transmit map data to a host.

2. Discussion of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments are directed to an apparatus and a method in which a memory system provides a host with map data that is referenced a threshold count or more, thereby allowing a request including a physical address associated with data to be read by the host to be provided to the memory system.

Also, various embodiments are directed to an apparatus and a method in which a memory system adjusts a threshold count according to a predetermined condition.

Technical aspects to be achieved in the present disclosure are not limited to the aforementioned issues but extent to others as will be clearly understood by those skilled in the art from the following description.

An embodiment provides a memory system, a data processing system, a controller, an operating method thereof, and a method for checking an operation.

In accordance with an embodiment, a data processing system includes: a host cache configured to cache one or more host map segments; a host controller configured to generate a read request including a logical address, and put a physical address corresponding to the logical address into the read request when the physical address is included in the one or more host map segments; a memory device configured to store data or provide the stored data in response to a request from the host controller and store memory map segments including mapping information between the logical address provided with the request and a valid physical address in which data corresponding to the logical address is stored; a memory controller configured to search for the valid physical address in the memory map segments, based on the read request, the logical address corresponding to the read request, and a physical address selectively provided and corresponding to the logical address, to control the memory device to perform a read operation corresponding to the read request based on the valid physical address, and to provide some of the memory map segments to be cached in the host cache as the host map segments, based on a read count threshold indicating the number of receptions of the read request for the logical address in the memory map segment; and a memory configured to store the read count, a miss count indicating the number of receptions of the read request with no physical address, and a provision count indicating the number of times the memory map segment is cached in the host cache, wherein the memory controller adjusts the read count threshold based on the miss count and the provision count.

In accordance with an embodiment, a memory system includes: a memory device configured to store data or provide the stored data in response to requests from a host and store memory map segments including mapping information between a logical address provided with the requests and a valid physical address in which the data corresponding to the logical address is stored; a memory controller configured to search for the valid physical address from the memory map segments, based on a read request, the logical address corresponding to the read request, and a physical address selectively provided and corresponding to the logical address, and to control the memory device to perform a read operation corresponding to the read request based on the valid physical address, and to provide some of the memory map segments to be cached in the host as host map segments, based on a read count threshold indicating the number of receptions of the read request for the logical address in the memory map segment; and a memory configured to store the read count, a miss count indicating the number of receptions of the read request with no physical address, and a provision count indicating the number of times the memory map segment is cached in the host, wherein the memory controller adjusts the read count threshold based on the miss count and the provision count.

In accordance with an embodiment, an operation method of a memory system, includes: searching for a valid physical address, at which data corresponding to a logical address is stored, in memory map segments stored in the memory system, based on a read request from a host, a logical address corresponding to the read request, and a physical address selectively provided and corresponding to the logical address and performing a read operation corresponding to the read request; caching some of the memory map segments in the host as host map segments based on a read count threshold indicating the number of receptions of the read request for the logical address in the memory map segment; and adjusting the read count threshold based on a miss count indicating the number of receptions of the read request with no physical address, and a provision count indicating the number of times the memory map segment is cached in the host.

In accordance with an embodiment, a data processing system includes: a host including a host cache; and a memory system including a memory device and a controller coupled to the memory device, the memory device storing memory map segments indicating mapping between logical addresses and physical addresses; wherein the controller is suitable for: receiving, from the host, a read request and a logical address corresponding to the read request; searching for a physical address, corresponding to the logical address, in the memory map segments; performing a read operation corresponding to the read request on the physical address; and providing a memory map segment, selected from the memory map segments, to the host for caching in the host cache, wherein the selected memory map segment indicates a logical address, the number of receptions of the read request for the logical address being greater than a read threshold; and wherein the read threshold is adjusted, based on the miss number of physical addresses received with the logical address from the host, and the cached number of the selected memory map segment cached in the host cache.

Aspects of the present disclosure are only some of preferred embodiments and various embodiments reflecting technical characteristics of the present embodiment can be derived and understood by those skilled in the art based on the following detailed description.

Effects of an apparatus in accordance with the disclosure will be described as follows.

In accordance with the embodiments, the memory system caches map data, which is referenced a threshold count or more, in the host cache, thereby allowing a request including a physical address of data to be read by the host to be provided to the memory system. Accordingly, it is possible to improve the performance of the memory system.

In accordance with the embodiments, it is possible to provide an apparatus and a method in which the memory system adjusts the threshold count according to a predetermined condition. Accordingly, in accordance with the embodiments, it is possible to improve the performance of the memory system by increasing the cache hit probability of the host cache.

Effects achievable in the disclosure are not limited to the aforementioned effects and the other unmentioned effects will be clearly understood by those skilled in the art from the following description.

BRIEF DESCRIPTION OF THE DRAWINGS

FIG. 6A and FIG. 6B illustrate a map management table in accordance with an embodiment.

FIG. 11 illustrates an operation of a memory system in accordance with an embodiment.

DETAILED DESCRIPTION

Figure 1:
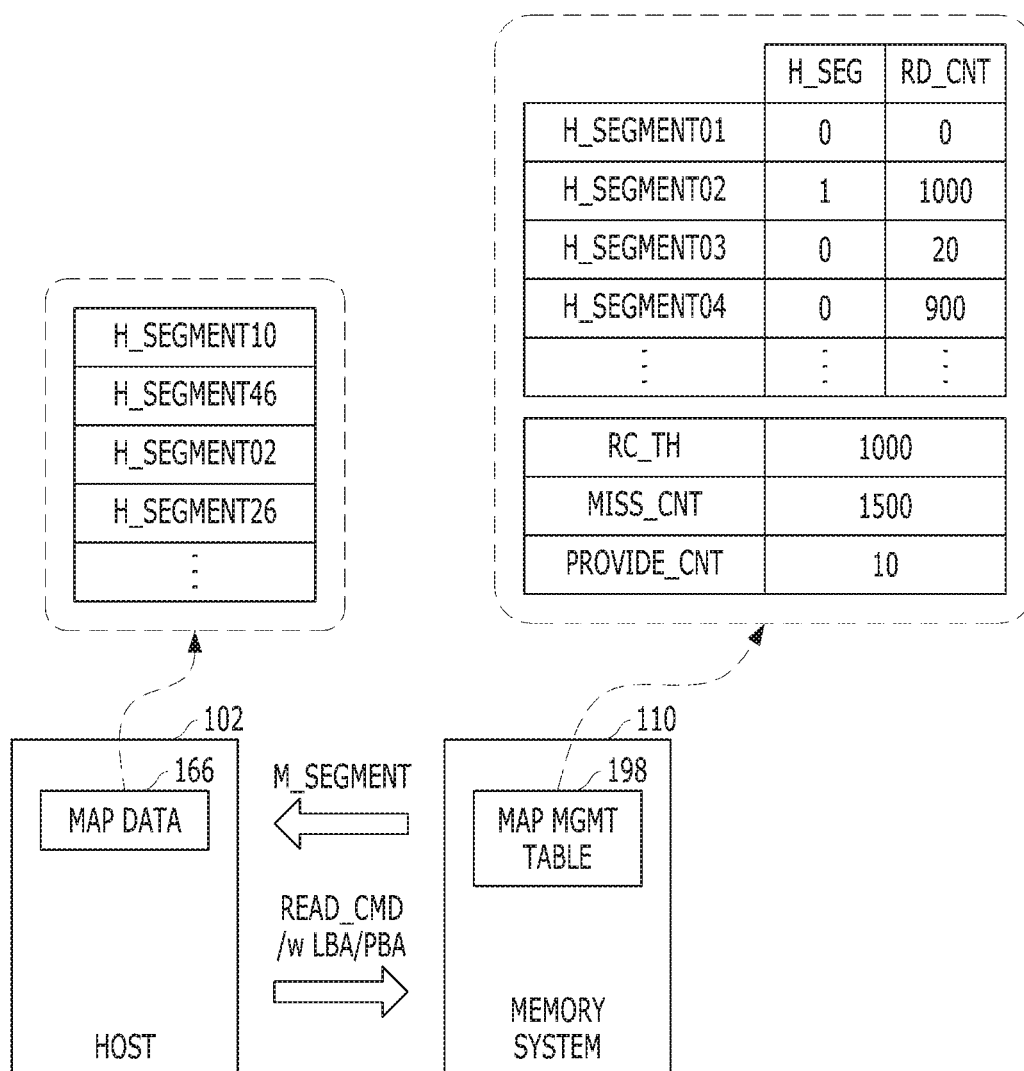
FIG. 1 illustrates a map data sharing method in accordance with an embodiment.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention. Also, throughout the specification, reference to "an embodiment" or the like is not necessarily to only one embodiment, and different references to any such phrase are not necessarily to the same embodiment(s).

Throughout the specification, when one element is referred to as being 'connected to' or 'coupled to' another element, it may indicate that the former element is directly connected or coupled to the latter element or electrically connected or coupled to the latter element with one or more elements interposed therebetween. Furthermore, when it is stated that an element "includes" or "comprises" a component, such statement does not preclude the element from including one or more additional components, unless stated or the context requires otherwise. Moreover, reference to any component in the singular does not preclude there being more than one of such components, unless stated or the context requires otherwise.

The following description is directed to providing those skilled in the art with a full understanding of the features and aspects of the present invention. Well known technical detail may be omitted to avoid unnecessarily obscuring such features and aspects.

Hereinafter, embodiments are described in more detail with reference to the drawings.

FIG. 1 is a diagram illustrating a map data sharing method in accordance with an embodiment.

Referring to FIG. 1, a host 102 and a memory system 110 may cooperate with each other. The host 102 may be a computing device and implemented in the form of a mobile device, a computer and/or a server. The memory system 110 may receive a command from the host 102 and store or output data in response to the received command.

The memory system 110 may have a storage space including a nonvolatile memory cell. For example, the memory system 110 may be implemented in the form of a flash memory and a solid-state drive (SSD).

In order to store data requested by the host 102 in the storage space including the nonvolatile memory cell, the memory system 110 may perform mapping a file system used by the host 102 to the storage space. For example, an address associated with data according to the file system may be referred to as a logical address and an address associated with data in the storage space may be referred to as a physical address.

The memory system 110 may store therein a plurality of map segments each including map data between one or more logical addresses and one or more physical addresses.

When the host 102 provides a logical address to the memory system 110 together with a read request, the memory system 110 may search for a physical address corresponding to the logical address, based on the mapping in at least one map segment stored therein and then output to the host 102 data stored in at the physical address found in the search.

If the host 102 performs the physical address search instead of the memory system 110, time required for the memory system 110 to output data corresponding to the read request provided by the host 102 may be reduced. In this situation, the host 102 may store map data that the host may directly access to search for a physical address and provide the physical address found in the search to the memory system 110.

The memory system 110 may provide a memory map segment M_SEGMENT to the host 102. The host 102 may receive the segment from the memory system 110 and may cache the segment in an internal memory of the host 102, as host map segment H_SEGMENT. The memory map segment may be stored in the memory system 110 and may include the latest map data. The host map segment may be cached by the host 102 after receiving the memory map segment from the memory system 110. The host map segment may be updated when an updated memory map segment is received.

When the memory system 110 provides the host 102 with all of multiple memory map segments and the host 102 stores such memory map segments as the host map segment, the memory system 110 may not need to individually provide the multiple memory map segments. However, it may be difficult for the host 102 to allocate a storage space in the internal memory in order to store the entire memory map segments managed by the memory system 110. Accordingly, the memory system 110 may selectively provide the host 102 with memory map segments including a logical address frequently accessed by the host 102.

The memory system 110 may store map management data 198 in order to selectively provide the host 102 with one or more memory map segments. The map management data 198 may be arranged in a map management (MGMT) table. The map management table may include an identifier of each segment as an index. The map management table may include fields for a read count RD_CNT for each memory segment and host provision (H_SEG) regarding whether each memory map segment has been provided to the host 102.

The read count RD_CNT for a given memory map segment may indicate the number of times a read request associated with that memory map segment has been received. Specifically, the read count RD_CNT may indicate the number of receptions of a read request for logical addresses in a given memory map segment. For example, a first memory map segment M_SEGMENT01 may include map data of first to $100^{th}$ logical addresses and a read request for the fifth logical address and a read request for the tenth logical address may be received from the host 102. Regardless of whether the host 102 has acquired physical addresses corresponding to the fifth logical address and the tenth logical address by referring to the host map segment or the memory map segment, the read count of the first memory map segment may be '2'. The memory system 110 may provide the host 102 with a memory map segment having a read count greater than or equal to a read count threshold RC_TH.

When the memory system 110 provides the host 102 with the memory map segment selected based on the fixed read count threshold RC_TH, the map cache hit probability of the host 102 may be reduced. In the example of FIG. 1, since the read count of a fourth memory map segment M_SEGMENT04 is '900' and is less than the read count threshold RC_TH, the fourth memory map segment may not be provided to the host 102. However, since the read count of the fourth memory map segment M_SEGMENT04 is close to the read count threshold RC_TH, it may be expected that the configuration logical addresses of the fourth memory map segment M_SEGMENT04 will be frequently read. Since the host 102 stores no fourth host map segment corresponding to the fourth memory map segment therein, a map cache miss may occur whenever the host 102 reads data of the configuration logical addresses of the fourth memory map segment M_SEGMENT04.

In accordance with an embodiment, the memory system 110 may adjust the read count threshold RC_TH according to a set condition in order to increase the map cache hit probability of the host 102. In an embodiment, the memory system 110 may adjust the read count threshold based on a miss count MISS_CNT and a provision count PROVIDE_CNT. The miss count indicates the total number of map cache misses that have occurred in the host 102. The provision count indicates the total number of memory map segments provided to the host 102. The map management data 198 may further include the miss count MISS_CNT, the provision count PROVIDE_CNT, and the read count threshold RC_TH.

Figure 2:
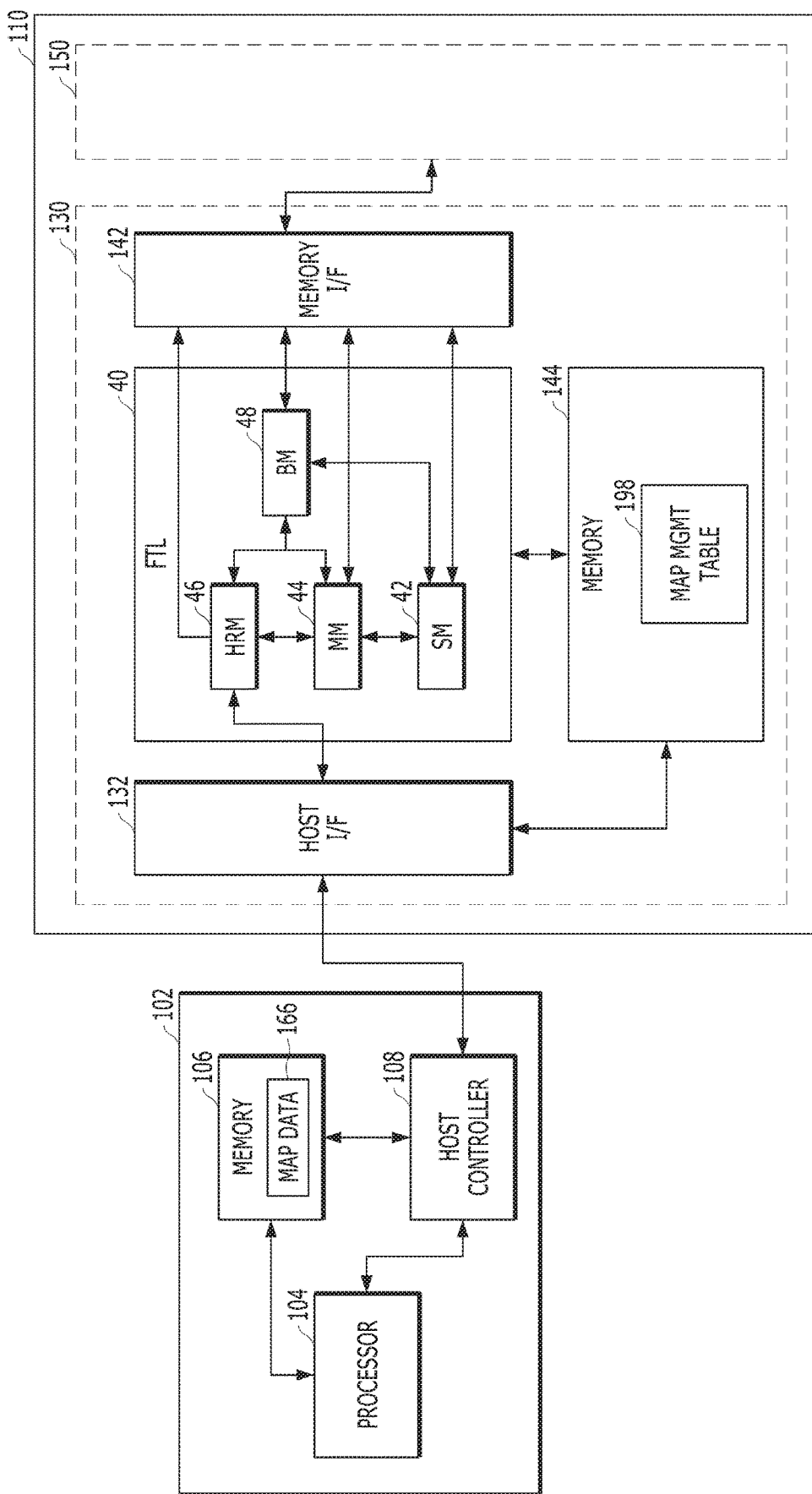
FIG. 2 and FIG. 3 illustrate an example in which a memory in a host is used as a cache device that stores map data.
Figure 3:
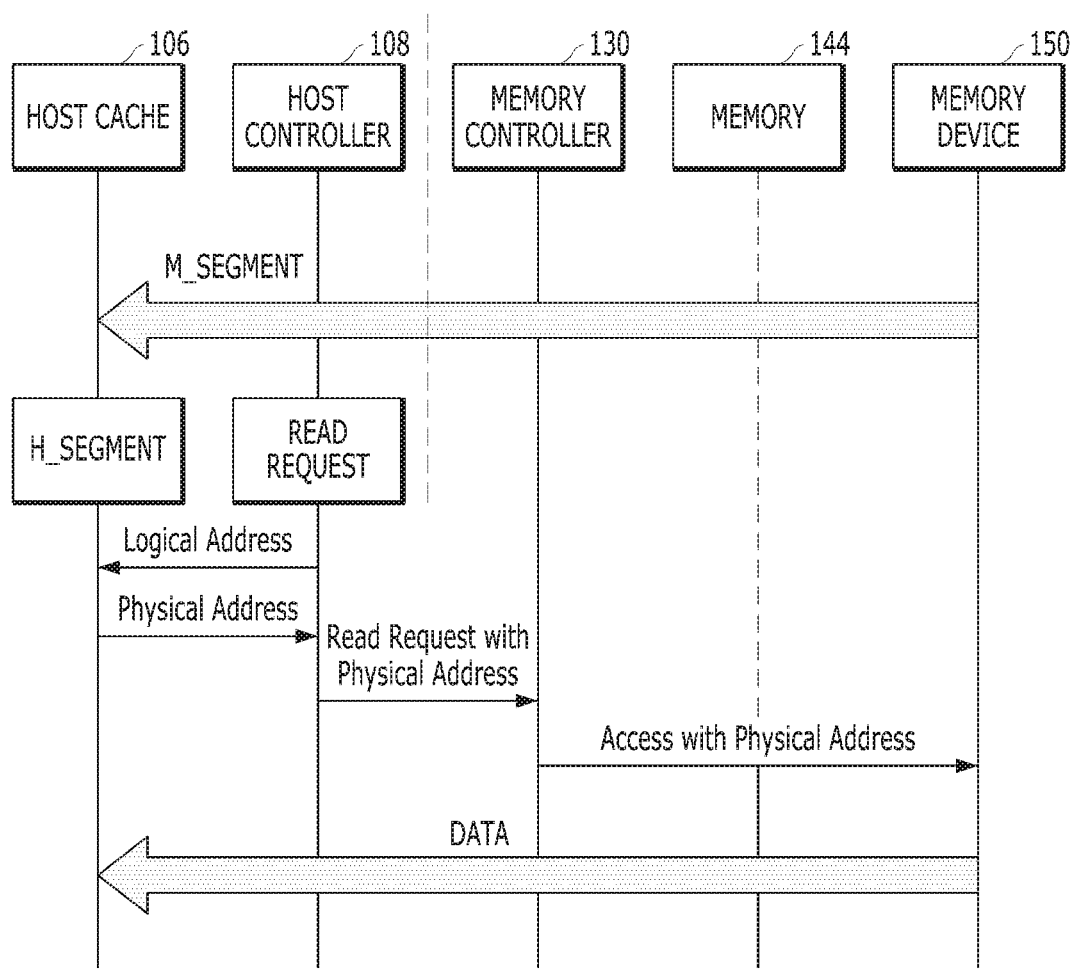

FIG. 2 and FIG. 3 are diagrams illustrating an example in which the memory in the host 102 is used as a cache device that caches map data.

Referring to FIG. 2, the host 102 may include a processor 104, a host cache 106, and a host controller 108. The host controller 108 may communicate with the memory system 110 through at least one of various interface protocols. The memory system 110 may include a memory controller 130 and a memory device 150.

The memory controller 130 may include a host interface (I/F) 132, a flash translation layer (FTL) 40, a memory interface (I/F) 142, and a memory 144, which cooperate with one another.

The host interface 132 may process requests of the host 102 and data. The host interface 132 may be configured to communicate with the host 102 through at least one of various interface protocols, such as a universal serial bus (USB), a multi-media card (MMC), a peripheral component interconnection-express (PCI-e or PCIe), a serial attached SCSI (SAS), a serial advanced technology attachment (SATA), a parallel advanced technology attachment (PATA), a small computer system interface (SCSI), an enhanced small disk interface (ESDI), an integrated device electronics (IDE), and/or a mobile industry processor interface (MIPI).

The memory interface 142 may serve as a memory/storage interface for interfacing between the memory controller 130 and the memory device 150 such that the memory controller 130 controls the memory device 150 in response to requests from the host 102. When the memory device 150 is a flash memory, particularly, a NAND flash memory, the memory interface 142 may generate a control signal for the memory device 150 and process data, which is provided to the memory device 150, under the control of a processor 134. The memory interface 142 may operate as an interface for processing commands and data between the memory controller 130 and the memory device 150, for example, a NAND flash interface.

The memory 144 may serve as a working memory of the memory system 110 and the memory controller 130, and store data for driving the memory system 110 and the memory controller 130. The memory controller 130 may control the memory device 150 to perform read, program, and erase operations in response to requests from the host 102. The memory controller 130 may provide the host 102 with data read from the memory device 150 and store data provided from the host 102 in the memory device 150. The memory 144 may further store the map management data 198 in a map management (MGMT) table.

The FTL 40 may include a host request manager (HRM) 46 for managing a host request received from the host interface 132, a map manager (MM) 44 for managing map data, a status manager (SM) 42 for performing garbage collection (GC) or wear leveling (WL), and a block manager (BM) 48 for executing a command on a block in the memory device 150.

The HRM 46 may process a read request, a write request, and an event-based request received from the host interface 132, using the MM 44 and the BM 48. The HRM 46 may provide a search request to the MM 44 in order to understand physical addresses corresponding to logical addresses of the received requests, provide a read request to the memory interface 142 with respect to the physical addresses, and process the read request. On the other hand, the HRM 46 may first write data to a specific page (i.e., a page that has not been written to or contains no data) of the memory device 150 by transmitting a write request to the BM 48, and then update mapping information between logical addresses and physical addresses by providing a map update request for the write request to the MM 44.

The BM 48 may convert a write request made by the HRM 46, the MM 44, and the SM 42 into a program command for the memory device 150, and manage a block in the memory device 150. In order to maximize the write performance of the memory system 110 (see FIG. 2), the BM 48 may collect a write request and send a program command for multiple planes and one-shot program operations to the memory interface 142. Furthermore, in order to maximize parallel processing of multiple channels and multidirectional flash controllers, the BM 48 may provide various program commands to the memory interface 142.

The BM 48 may manage a flash block according to the number of valid pages. When a free block is needed, the BM 48 may select and erase a block with no valid page. When garbage collection is needed, the BM 48 may select a block including the smallest number of valid pages. In order for the BM 48 to have sufficient empty blocks, the SM 42 may perform garbage collection to collect valid data, move the collected valid data to an empty block, and delete blocks from which the valid data have been moved. When the BM 48 provides the SM 42 with information on a block to be deleted, the GC/WL 42 may first check all flash pages of the block to be deleted and check whether each page is valid. For example, in order to determine the validity of each page, the SM 42 may identify a logical address stored in the out-of-band (OOB) area of each page and then compare an actual address of the page with an actual address mapped to a logical address obtained from an inquiry request of the MM 44. The SM 42 may provide the BM 48 with a write request of each valid page. When the program operation is completed, the MM 44 may update a mapping table.

The MM 44 may manage a mapping table including mapping information between logical addresses and physical addresses and process requests such as inquires and updates generated by the HRM 46 and the SM 42.

The MM 44 may store memory map segments in the memory device 150 and cache mapping items according to the capacity of the memory 144. When a map cache miss occurs while the MM 44 processes search and update requests, the MM 44 may provide a read request to the memory interface 142 and load a mapping table stored in the memory device 150. The MM 44 may provide the memory map segment stored in the memory device 150 to the host cache 106 based on the read count threshold of the memory map segment. The MM 44 may adjust the read count threshold based on the provision count and the miss count.

When the number of dirty cache blocks of the MM 44 exceeds a specific threshold value, the MM 44 may generate a clean cache block by providing a write request to the BM 48 and store a dirty map table in the memory device 150.

When garbage collection is performed, the HRM 46 may program the latest version of data for the same logical address of a page and issue an update request simultaneously while the SM 42 copies a valid page. When the SM 42 requests a map update in a state in which the copy of the valid page is not normally completed, the MM 44 may not update the mapping table. The MM 44 may perform the map update only when the latest map table still indicates a previous actual address, thereby ensuring accuracy.

In accordance with an embodiment, the memory device 150 may be a flash memory, for example, a nonvolatile memory such as a NAND flash memory. However, the memory device 150 may also be implemented as any one of various memories, such as a phase-change random access memory (PCRAM), a resistive random access memory (RRAM or ReRAM), a ferroelectrics random access memory (FRAM), and/or a spin transfer torque magnetic random access memory (STT-RAM or STT-MRAM).

The memory device 150 may include a plurality of memory blocks, each of which may be a single level cell (SLC) memory block of SLCs each of which stores one bit of data, or a multi-level cell (MLC) memory block of MLCs each of which stores a plurality of bits of data. The SLC memory block may include a plurality of pages implemented with SLCs. The SLC memory block may have high durability and quick data operation performance. The MLC memory block may include a plurality of pages implemented with MLCs. The MLC memory block may have a larger data storage space than the SLC memory block. That is, the MLC memory block may be highly integrated.

The memory device 150 may be implemented as a two-dimensional or three-dimensional memory device. Each memory block in the memory device 150 may include a plurality of NAND strings extending along three mutually orthogonal directions. Each of the NAND strings may be electrically connected to a bit line, at least one string selection line, at least one ground selection line, a plurality of word lines, at least one dummy word line, and a common source line, and may include a plurality of transistor structures.

The host 102 may include the processor 104 and the host cache 106, which gives the host 102 higher performance and larger capacity as compared with the memory system 110. Unlike the memory system 110, the processor 104 and the host cache 106 have a small spatial limitation and hardware upgrade of the processor 104 and the host cache 106 is feasible as needed. Accordingly, in order to improve operational efficiency, the memory system 10 may utilize resources of the host 102.

As the amount of data stored by the memory system 110 increases, the amount of corresponding metadata that is stored in the memory system 110 also increases. Since the space of the memory 144 in which the memory controller 130 may load metadata is limited, the increased amount of metadata imposes a burden on the operation of the memory controller 130. For example, due to the limited available space in the memory 144 for metadata, the memory controller 130 may only load some, not all, of the metadata. In a case where a piece of metadata to be accessed by the host 102 is not included in the portion of metadata loaded, when some of the loaded metadata has been updated, the memory controller 130 needs to store the metadata again in the memory device 150 and read metadata corresponding to the piece to be accessed by the host 102 from the memory device 150. Such operations may be performed as needed in order for the memory controller 130 to perform a read or write operation required by the host 102, and may degrade the operational performance of the memory system 110.

In accordance with an embodiment, the storage space of the host cache 106 in the host 102 may be up to thousands of times larger than the memory 144 available by the memory controller 130. Accordingly, the memory system 110 may provide the host cache 106 with map data used by the memory controller 130, thereby allowing the host cache 106 to be used as a cache memory for an address translation process performed by the memory system 110. In such a case, based on map data 166 cached in the host cache 106, the host 102 may translate a logical address into a physical address and then provide the physical address to the memory system 110 together with a request. In that case, the memory system 110 need not translate the logical address into the physical address. Rather, the memory system 110 need only access the memory device 150 based on the provided physical address. In such a case, it is possible to reduce the operation burden on the memory controller 130 in using the memory 144, so that the operational efficiency of the memory system 110 may be improved.

Even though the memory system 110 provides the map data to the host 102, the memory system 110 may still perform update, deletion, and generation of the map data. This is because the memory controller 130 performs a background operation such as garbage collection and wear leveling according to the operation state of the memory device 150 and determines a physical position of the memory device 150 in which data received from the host 102 is stored, so that a physical address of data in the memory device 150 may be changed by the memory controller 130.

That is, when it is determined that the map data 166 provided to the host 102 needs to be updated in the process of managing the map data 166, the memory system 110 may request the host 102 to update the map data 166. In accordance with an embodiment, when a memory map segment is provided to the host 102 and then is changed, the memory system 110 may store, in the memory 144, a flag indicating that the memory map segment has been changed. The memory system 110 may provide the host 102 with the changed memory map segment at a set time or cycle. In response to a request of the memory system 110, the host 102 may update the map data 166 cached in the host cache 106. In this way, the map data 166 may be kept up to date, and even though the host controller 108 translates an address value to be transmitted to the memory system 110 using the map data 166, the operation may be performed without error.

Map data between logical addresses and physical addresses may include logical-to-physical (L2P) map data for checking physical addresses corresponding to logical addresses and physical-to-logical (P2L) map data for checking logical addresses corresponding to physical addresses. The map data 166 may include L2P map data for checking physical addresses corresponding to logical addresses. The P2L map data is mainly used for an internal operation of the memory system 110 and may not be used for an operation in which the host 102 stores data in the memory system 110 or reads data corresponding to a specific logical address from the memory system 110. In accordance with an embodiment, the memory system 110 may not transmit the P2L map data to the host 102.

The memory controller 130 may store map data in the memory device 150 while managing (e.g., generating, deleting, and updating) the map data. Since the host cache 106 is a volatile memory device, the map data 166 cached in the host cache 106 may be lost as a result of an event such as interruption of the supply of power to the host 102 and the memory system 110. Accordingly, the memory controller 130 in the memory system 110 may keep the map data 166 cached in the host cache 106 up to date and store the latest L2P map data or PH map data in the memory device 150.

With reference to FIG. 2 and FIG. 3, an operation in which the host 102 reads data in the memory system 110 when the map data 166 is stored in the host cache 106 is described.

Power is supplied to the host 102 and the memory system 110, so that the host 102 and the memory system 110 may cooperate with each other. When the host 102 and the memory system 110 cooperate with each other, the memory map segment M_SEGMENT stored in the memory device 150 may be transmitted to the host cache 106 through the memory controller 130.

When a read request is generated by the processor 104 in the host 102, the read request is provided to the host controller 108.

The host controller 108 receives the read request and then transmits a logical address corresponding to the read request to the host cache 106. Based on the map data 166 stored in the host cache 106, the host controller 108 may recognize a physical address corresponding to the logical address.

The host controller 108 provides, to the memory controller 130, the read request together with the physical address. The memory controller 130 may access the memory device 150 based on the received read request and physical address. Data in the memory device 150 stored at a position corresponding to the physical address may be provided to the host cache 106 through the memory controller 130.

When the memory controller 130 receives the physical address together with the read request, it may be possible to omit a process in which the memory controller 130 receives a logical address from the host 102 and finds a corresponding physical address. Particularly, it may be possible to omit an operation in which the memory controller 130 accesses the memory device 150 to read metadata in the process of finding the physical address. In this way, a process in which the host 102 reads data stored in the memory system 110 may be faster.

Figure 4:
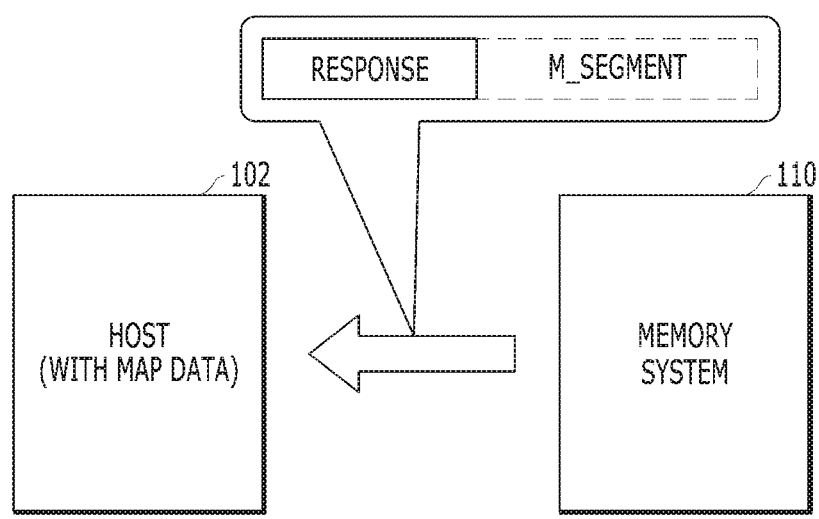
FIG. 4 illustrates a transaction between a host and a memory system in a data processing system in accordance with an embodiment.

FIG. 4 is a diagram illustrating a transaction between the host 102 and the memory system 110 in the data processing system in accordance with an embodiment.

Referring to FIG. 4, the memory system 110 may transmit the memory map segment M_SEGMENT to the host 102. The memory system 110 may transmit the memory map segment M_SEGMENT using a response RESPONSE corresponding to a command of the host 102.

There is no particular limitation on the type of response for transmitting map data. For example, the memory system 110 may transmit map data to the host 102 using a response corresponding to a read request, a response corresponding to a write command, and a response corresponding to an erase command.

The memory system 110 and the host 102 may exchange requests and responses according to a unit format set according to a specific protocol. For example, the format of the response RESPONSE may include a basic header, a request due to the success or failure of a request provided by the host 102, and additional information indicating the state of the memory system 110. The memory system 110 may put map data into the response RESPONSE and transmit the response RESPONSE to the host 102.

Figure 5:
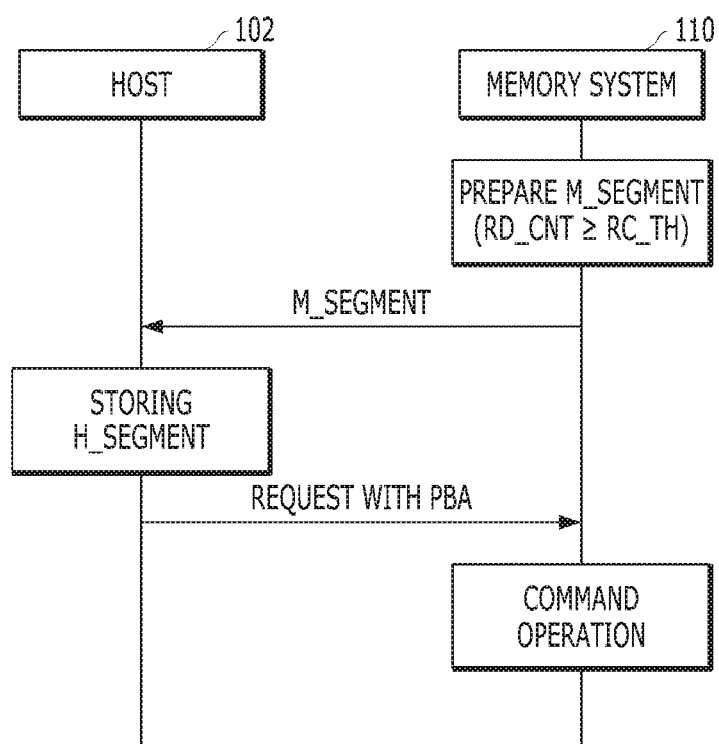
FIG. 5 illustrates operations of a host and a memory system in accordance with an embodiment.

FIG. 5 is a diagram illustrating operations of the host 102 and the memory system 110 in accordance with an embodiment. Specifically, FIG. 5 illustrates a process in which the memory system 110 transmits map data based on the need of the host 102.

Referring to FIG. 5, the memory system 110 may provide the host 102 with a memory map segment M_SEGMENT, which is expected to be frequently referenced by the host 102, in order to improve the read performance of the memory system 110. For this operation, first, the memory system 110 may count the number of reads or read requests to generate a read count RC_TH for each memory map segment based on a logical address in a read request from the host 102. The memory system 110 may prepare a memory map segment M_SEGMENT having a read count RD_CNT greater than or equal to a read count threshold RC_TH.

The memory system 110 may provide the host 102 with the prepared memory map segment M_SEGMENT. The host 102 may store the memory map segment M_SEGMENT from the memory system 110 in the internal storage space thereof (for example, the host cache 106 described in FIG. 4) as a host map segment H_SEGMENT.

The host 102 may put a physical address PBA into a request to be provided to the memory system 110 by referring to the stored host map segment H_SEGMENT and provide the request with the physical address PBA to the memory system 110. The memory system 110 may perform a corresponding operation using the physical address PBA in the request.

FIG. 6A is a diagram illustrating the map management data 198 in accordance with an embodiment. FIG. 6A illustrates the map management data 198 at a first time.

Referring to FIG. 6A, the map management data 198 may be presented in the map management table. The map management table may include an identifier of each memory map segment as an index. The map management table may include fields for the read count RD_CNT, which is indicated for each memory map segment and host provision (H_SEG), which indicates whether the corresponding memory map segment has been provided to the host 102. The read count of each memory map segment may be the number of times any of the logical addresses in that segment was associated with a read request. The memory system 110 may provide the host 102 with a memory map segment having a read count RD_CNT greater than or equal to the read count threshold RC_TH. For example, when referring to the read count field of the map management table, the read count of a second memory map segment M_SEGMENT02 at the first time RD_CNT (1000) is equal to the read count threshold RC_TH (thereby satisfying the greater than or equal to requirement), and as indicated by the host provision field H_SEG, the second memory map segment may have been provided to the host 102 one time.

The MM 44 of FIG. 2 may increase the read count of the memory map segment based on the logical address in the read request of the host 102. When the MM 44 increases the read count of each memory map segment by substantially the same value in response to all read requests from the past to the present, it may be difficult to reflect the latest read trend. In accordance with an embodiment, in order to reduce the influence of past read counts, the MM 44 may periodically decrease the read count of each memory map segment at a set rate or a set percentage.

FIG. 6B illustrates the map management data 198 at a second time after the first time. FIG. 63 illustrates a case where, relative to the first time indicated by FIG. 6A, the MM 44 after the first time decreases the read count of each memory map segment to 90% of the existing read count and increases the read count of a corresponding memory map segment in response to read requests.

Referring to FIG. 6A and FIG. 6B, the configuration logical addresses of the first memory map segment M_SEGMENT01 may not have been read at all up to the first time and may have been read 10 times after the first time up to the second time. The MM 44 may change the read count of the first memory map segment to '10'.

The MM 44 may decrease the read count of the second memory map segment M_SEGMENT02, which was '1,000' after the first time, to '900' corresponding to 90% of the existing read count. The configuration logical addresses of the second memory map segment M_SEGMENT02 may not be read at all after the first time up to the second time. The read count of the second memory map segment M_SEGMENT02 (1000) was equal to the read count threshold RC_TH (1000) at the first time but the read count of the second memory map segment M_SEGMENT02 (900) is less than the read count threshold RC_TH (1000) at the second time. The MM 44 may provide the host 102 with a remove signal REMOVE in addition to a response to be provided to the host 102 such that the second memory map segment is not maintained any longer in the host 102.

The configuration logical address of the third memory map segment M_SEGMENT03 may have been read once after the first time. The MM 44 may decrease the read count of the third memory map segment M_SEGMENT03, which was '20' at the first time, to '18' corresponding to 90% of the existing read count and change '18' to '19' to reflect the one read.

The configuration logical address of the fourth memory map segment M_SEGMENT04 may have been read 194 times after the first time up to the second time. The MM 44 may decrease the read count of the fourth memory map segment M_SEGMENT04, which was '900' at the first time, to '810' corresponding to 90% of the existing read count and change '810' to '1004' to reflect the 194 reads. Since the configuration logical addresses of the fourth memory map segment M_SEGMENT04 have been frequently read, the read count of the fourth memory map segment M_SEGMENT04 may be greater than or equal to the read count threshold RC_TH. The MM 44 may provide the fourth memory map segment M_SEGMENT04 to the host 102 in order to improve the performance of the read operation.

Figure 7:
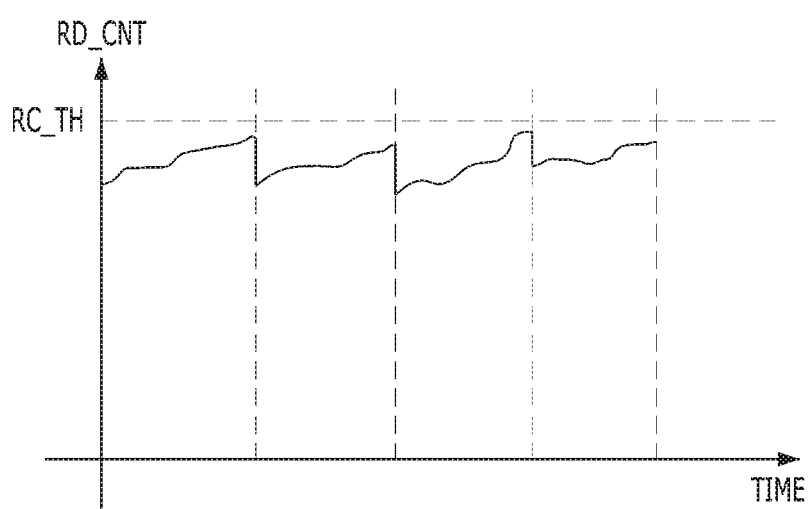
FIG. 7 is a graph for explaining an issue that may occur when a memory system provides a memory map segment based on a fixed read count threshold.

FIG. 7 is a graph for explaining an issue that may occur when the memory system 110 provides a memory map segment based on the fixed read count threshold.

In the graph of FIG. 7, a horizontal axis denotes time TIME and a vertical axis denotes the read count RD_CNT of the memory map segment. The fixed read count threshold RC_TH is illustrated on the vertical axis. As described with reference to FIG. 6A and FIG. 6B, in order to reduce the influence of the past reads and reflect the latest read trend, the MM 44 may decrease the read count of each memory map segment at a set cycle, i.e., periodically. Even though the configuration logical address of a certain memory map segment is read several times, the read count of the certain memory map segment may repeatedly increase and decrease and may be kept slightly less than the fixed read count threshold. Since the read count of the certain memory map segment is less than the fixed read count threshold, the MM 44 may not provide the certain memory map segment to the host 102. Since the host cache 106 does not cache a host map segment corresponding to the certain memory map segment, a map cache miss may occur whenever the host 102 reads configuration logical addresses in the certain memory map segment.

When there are several memory map segments having a read count slightly less than the fixed read count threshold, a map cache miss count may increase significantly. When a map cache miss occurs in the host 102 and the FTL 40 frequently searches for a physical address from memory map segments, the read performance of the memory system 110 may be degraded.

In accordance with an embodiment, when there are many misses, reflected by a high miss count, and few memory map segments that have been provided, i.e., a low provision count, the MM 44 may decrease the read count threshold and provide the host 102 with memory map segments having a slightly lower read count. When the memory map segments having a slightly lower read count is provided to the host 102, the map cache miss probability of the host 102 is reduced, so that it is possible to improve the read performance of the memory system 110.

As described with reference to FIG. 1, the provision count indicates the total number of memory map segments provided to the host 102. An example of a method in which the memory system 110 counts the number of memory map segments provided to the host 102 to generate a provision count is described with reference to FIG. 8. The miss count indicates the total number of map cache misses that have occurred in the host 102. An example of a method in which the memory system 110 counts the map cache misses is described with reference to FIG. 10.

Figure 8:
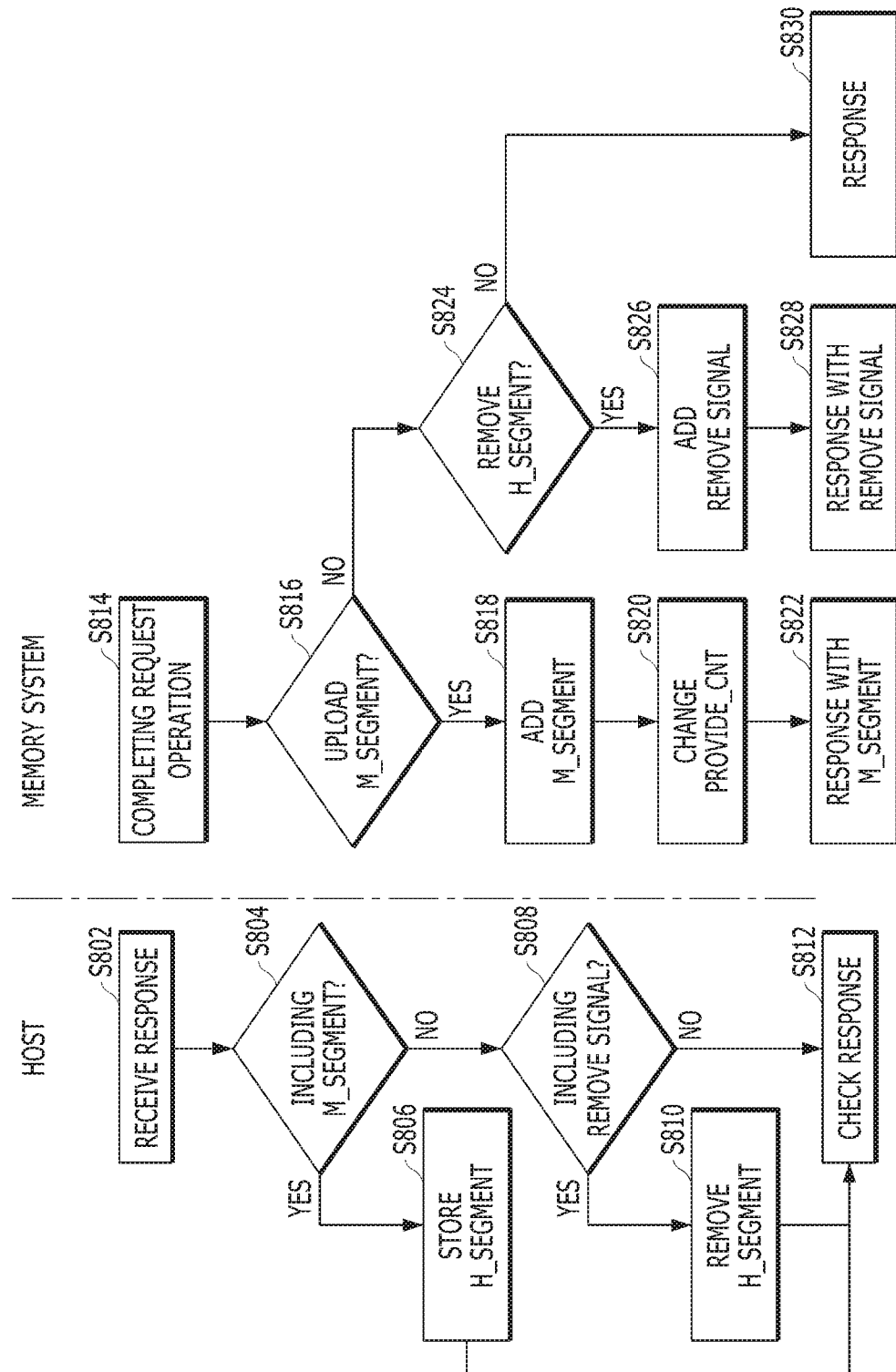
FIG. 8 illustrates operations of a host and a memory system in accordance with an embodiment.

FIG. 8 illustrates a second operation of the host 102 and the memory system 110 in accordance with an embodiment. Steps S814, S816, S818, S820, S822, S824, S826, S828, and S830 illustrate a case where the memory system 110 completes an operation corresponding to a request from the host 102 and intends to provide a memory map segment M_SEGMENT. Steps S802, S804, S806, S808, S810, and S812 illustrate a case where the host 102 stores the memory map segment M_SEGMENT received with a response from the memory system 110.

Referring to FIG. 8, in step S814, the FTL 40 may complete the operation corresponding to the request from the host 102. In step S816, the MM 44 of the FTL 40 may determine whether there is a memory map segment M_SEGMENT to be provided (or uploaded) to the host 102 before providing the host 102 with a response RESPONSE corresponding to the request. The memory map segment M_SEGMENT to be provided to the host 102 may be a segment that has not previously been provided to the host 102 and that has a read count greater than or equal to a threshold.

When there is the memory map segment M_SEGMENT to be provided to the host 102 ("YES" in step S816), the MM 44 may add the memory map segment M_SEGMENT to the response RESPONSE in step S818.

In step S820, the MM 44 may change a provision count PROVIDE_CNT. The provision count PROVIDE_CNT may be changed whenever a memory map segment is provided to the host cache 106 regardless of which memory map segment is provided to the host cache 106. The MM 44 may initialize the provision count periodically, i.e., at set cyclical intervals.

In step S822, the host interface 132 may provide the host 102 with the response RESPONSE with the memory map segment M_SEGMENT.

When there is no memory map segment M_SEGMENT to be provided to the host 102 ("NO" in step S816), the MM 44 may determine whether there is a memory map segment to be removed from the host 102 in step S824. The memory map segment to be removed from the host 102 may be a host map segment corresponding to the memory map segment at present and having a read count less than a threshold. For example, a host map segment corresponding to a memory map segment whose configuration logical addresses have been frequently accessed in the past but are not frequently accessed at present may be removed from the host 102. In the past, even though the read count of a corresponding memory map segment was greater than or equal to the threshold and thus provided to the host 102, the read count may be periodically decreased as described in FIG. 6A and FIG. 6B and the current read count may be less than the threshold.

When there is the memory map segment to be removed from the host 102 ("YES" in step S824), the MM 44 may add a remove signal to a response RESPONSE in step S826. In step S828, the host interface 132 may provide the host 102 with the response RESPONSE with the remove signal.

When there is no memory map segment to be removed from the host 102 ("NO" in step S824), the host interface 132 may provide the host 102 with a response RESPONSE corresponding to a request of the host 102.

In step S802, the host controller 108 may receive the response RESPONSE from the memory system 110.

In step S804, the processor 104 may determine whether the response includes the memory map segment M_SEGMENT.

When the response includes the memory map segment M_SEGMENT ("YES" in step S804), the processor 104 may cache the memory map segment M_SEGMENT in the response in the host cache 106 as a host map segment H_SEGMENT in step S806. Then, in step S812, the processor 104 may check a response corresponding to a request.

When the response includes no memory map segment M_SEGMENT ("NO" in step S804), the processor 104 may determine whether the response includes the remove signal in step S808.

When the response includes the remove signal ("YES" in step S808), the processor 104 may remove the memory map segment corresponding to the remove signal in the response from the host cache 106, in step S810. In step S812, the processor 104 may check the response corresponding to the request.

When the response includes no remove signal ("NO" in step S808), the processor 104 may check the response corresponding to the request in step S812.

Figure 9:
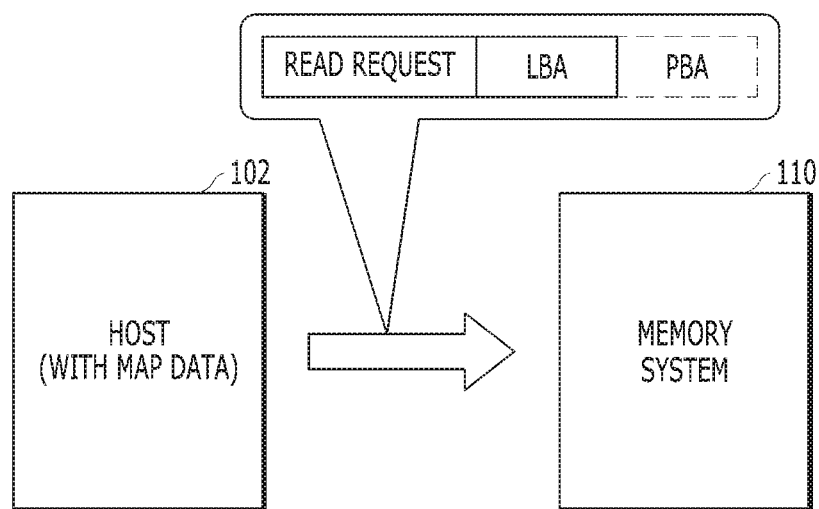
FIG. 9 illustrates a transaction between a host and a memory system in a data processing system in accordance with an embodiment.

FIG. 9 illustrates the transaction between the host 102 and the memory system 110 in the data processing system in accordance with an embodiment.

Referring to FIG. 9, the host 102 that stores map data may transmit a read request READ REQUEST with a logical address (LBA) and a physical address (PBA) to the memory system 110. When there is a physical address (PBA) corresponding to a logical address (LBA) corresponding to a read request in the map data stored by the host 102, that is, a host map segment, the host 102 may transmit the read request with the logical address (LBA) and the physical address (PBA) to the memory system 110. However, when there is no physical address (PBA) corresponding to the logical address (LBA) corresponding to the read request in the map data stored by the host 102, the host 102 may provide the memory system 110 with a read request with only the logical address (LBA) without the physical address (PBA).

Although FIG. 9 illustrates a read request as an example, in an embodiment, the processing may also be applied to a write request and an erase request that may be provided by the host 102 to the memory system 110.

Figure 10:
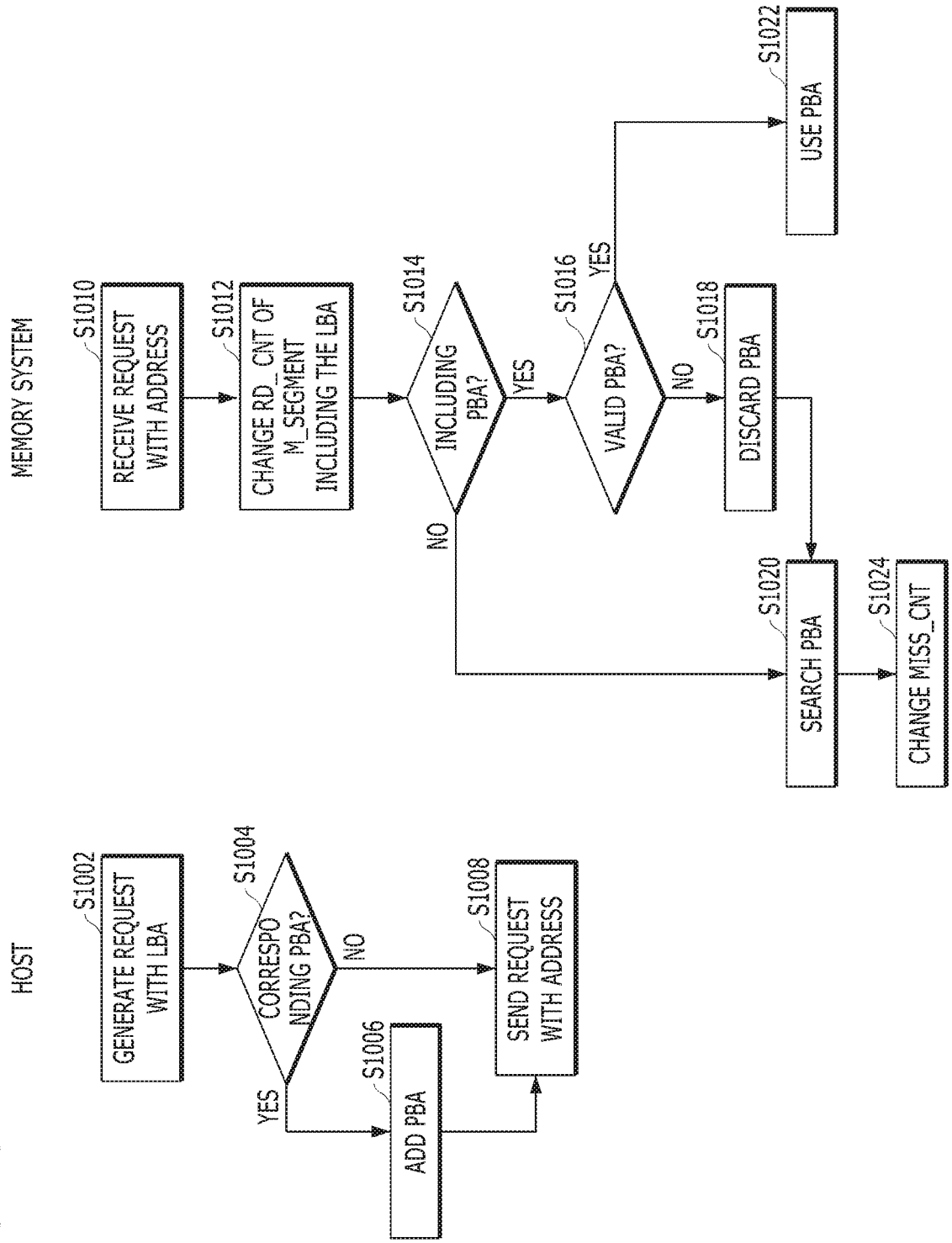
FIG. 10 illustrates operations of a host and a memory system in accordance with an embodiment.

FIG. 10 illustrates operations of the host 102 and the memory system 110 in accordance with an embodiment.

Steps S1002, S1004, S1006, and S1008 illustrate the operation of the host 102 that provides a request with a logical address (LBA) and a physical address (PBA). Steps S1010, S1012, S1014, S1016, S1018, S1020, S1022, and S1024 illustrate a detailed operation of the memory system 110 that receives the request from the host 102.

Referring to FIG. 10, in step S1002, the processor 104 may generate a request REQUEST with the logical address (LBA).

In step S1004, the host controller 108 may determine whether a physical address (PBA) corresponding to a logical address is included in a host map segment cached to the host cache 106.

When there is no corresponding physical address ("NIO" in step S1004), the host controller 108 may provide the memory system 110 with a request REQUEST with a logical address in step S1008.

When there is the corresponding physical address ("YES" in step S1004), the host controller 108 may add a physical address PBA to the request REQUEST with the logical address, in step S1006. In step S1008, the host controller 108 may provide the memory system 110 with the request REQUEST with the logical address and the physical address in step S1008.

In step S1010, the host interface 132 may receive the request REQUEST from an exterior source (i.e., a host 102). A command received from the host 102 may include a logical address LBA. In step S1012, the MM 44 may change the read count RD_CNT of a memory map segment M_SEGMENT including the logical address LBA.

In step S1014, the MM 44 may determine whether a physical address PBA is included in the received request REQUEST.

When there is no physical address PBA in the received request REQUEST ("NO" in step S1014), the MM 44 may search for a physical address PBA corresponding to the logical address LBA in the received request REQUEST, in step S1020.

When the physical address PBA is in the received request REQUEST ("YES" in step S1014), the MM 44 may determine whether the physical address PBA is valid, in step S1016. The host 102 may perform mapping based on the memory map segment received from the memory system 110, put the physical address PBA into a request, and provide the memory system 110 with the request with the physical address PBA. After the memory system 110 provides the memory map segment to the host 102, a memory map segment managed by the memory system 110 may be changed and updated. When the host map segment and the memory map segment are not the same, since the physical address received from the host 102 may not be used as is, the MM 44 may determine whether the physical address in the received request is valid.

For example, when a memory map segment is provided to the host 102 and then is changed, the MM 44 may store a flag, which indicates that the memory map segment has been changed, in the memory 144. When a logical address and a physical address are received from the host 102, the MM 44 may determine whether the physical address is valid by determining whether a memory map segment including the logical address has been changed. A method of determining whether the physical address received from the host 102 is valid may vary depending on the implementation of the memory system 110.

When the physical address PBA in the received request REQUEST is valid ("YES" in step S1016), the MM 44 may perform an operation corresponding to the request REQUEST using the physical address PBA, in step S1022.

When the physical address PBA in the received request REQUEST is not valid ("NO" in step S1016), the MM 44 may discard the physical address PBA in step S1018. In step S1020, the MM 44 may search for the physical address PBA based on the logical address in the received request REQUEST.

It can be understood that a map cache hit has occurred in the host 102 when the request of the host 102 includes a valid physical address PBA, so that the memory system 110 is able to use the physical address PBA in the request REQUEST in step S1022. On the other hand, it can be understood that a map cache miss has occurred in the host 102 when the request of the host 102 includes no valid physical address, so that the memory system 110 searches for a physical address in step S1020. Accordingly, after searching for the physical address in step S1020, the MM 44 may change a miss count MISS_CNT in step S1024. The miss count MISS_CNT may be changed whenever a map cache miss occurs regardless of the occurrence of a map cache miss of the configuration logical address of a certain memory map segment. In an embodiment, the MM 44 may initialize the miss count MISS_CNT periodically, i.e., at cyclical intervals.

FIG. 11 is a flowchart illustrating an operation of the memory system 110 in accordance with an embodiment.

Referring to FIG. 11, in step S1102, the MM 44 may determine whether a provision count PROVIDE_CNT is greater than or equal to a provision count threshold PC_TH.

When the provision count PROVIDE_CNT is greater than or equal to the provision count threshold PC_TH ("YES" in step S1102), the MM 44 may maintain a read count threshold. In step S1110, the MM 44 may provide the host 102 with a memory map segment M_SEGMENT, based on the maintained read count threshold RC_TH. The provided memory map segment M_SEGMENT may have a read count greater than or equal to the read count threshold RC_TH.

When the provision count PROVIDE_CNT is less than the provision count threshold PC_TH ("NO" in step S1102), the MM 44 may determine whether a miss count MISS_CNT is greater than or equal to a miss count threshold MC_TH, in step S1104.

When the miss count MISS_CNT is greater than or equal to the miss count threshold MC_TH ("YES" in step S1104), the MM 44 may decrease the read count threshold RC_TH in step S1106. In step S1110, the MM 44 may provide the host 102 with a memory map segment M_SEGMENT, based on the decreased read count threshold RC_TH. The provided memory map segment M_SEGMENT may have a read count greater than or equal to the read count threshold RC_TH.

When the provision count PROVIDE_CNT is less than the provision count threshold PC_TH and the miss count MISS_CNT is greater than or equal to the miss count threshold MC_TH, it may indicate a case where many segments are not provided from the memory system 110 to the host 102 despite a large number of map cache misses in the host 102. The MM 44 may provide memory map segments to the host 102 based on the decreased read count threshold, so that it is possible to reduce the map cache miss probability of the host 102. When the map cache miss probability of the host 102 is reduced, it is possible to reduce the number of times that the memory system 110 searches for a physical address among memory map segments. Accordingly, it is possible to improve the performance of the memory system 110.

When the miss count MISS_CNT is less than the miss count threshold MC_TH ("NO" in step S1104), the MM 44 may increase the read count threshold RC_TH in step S1108. In step S1110, the MM 44 may provide the host 102 with a memory map segment M_SEGMENT, based on the increased read count threshold RC_TH. The provided memory map segment M_SEGMENT may have a read count greater than or equal to the read count threshold RC_TH.

When the provision count PROVIDE_CNT is less than the provision count threshold PC_TH and the miss count MISS_CNT is less than the miss count threshold MC_TH, it may indicate a case where the host 102 may successfully perform physical address search with only host map segments. Accordingly, the MM 44 may recover the decreased read count threshold by increasing the read count threshold. In an embodiment, there may be an upper limit of the read count threshold.

In an embodiment, steps S1102, S1104, S1106, and S1108 may be performed periodically or at cyclical intervals. The MM 44 may initialize the provision count and the miss count periodically or at cyclical intervals.

In an embodiment, the read count may be periodically decreased fixed percentage. As described with reference to FIG. 6A and FIG. 6B, the MM 44 periodically decreases the read count of each memory map segment, so that it is possible to reduce the influence of the past read counts and reflect the latest read trend.

In accordance with an embodiment, the memory system 110 may provide the host 102 with at least some memory map segments including map data indicating mapping between logical addresses and physical addresses. The host 102 may store the memory map segments as host map segments. The host 102 may provide a physical address identified in a search of the host map segments as well as a logical address to be read when providing a read request.

In accordance with an embodiment, the memory system 110 may provide the host 102 with memory map segments including a logical address that is frequently read by the host 102. Depending on the temporal and spatial locality of data access, the host 102 is highly likely to access the logical address in the memory map segment. Therefore, there is a high probability that a map cache hit will occur and a physical address will be provided together therewith when the host 102 provides a read request.

In accordance with an embodiment, the memory system 110 may provide the host 102 with memory map segments having a read count greater than or equal to the read count threshold and change the read count threshold according to a set condition. The memory system 110 provides the memory map segments to the host 102 based on the changed read count threshold, thereby further increasing the probability that a map cache hit will occur and a physical address will be provided together therewith when the host 102 provides a read request. Accordingly, it is possible to further improve the read performance of the memory system 110.

Although various embodiments have been illustrated and described, it will be apparent to those skilled in the art that various changes and modifications may be made without departing from the spirit and scope of the invention as defined in the following claims. The present invention encompasses all such changes and modifications that fall within the scope of the claims.

What is claimed is:

1. A data processing system comprising:
   a host cache configured to cache one or more host map segments;
   a host controller configured to generate a read request including a logical address, and put a physical address corresponding to the logical address into the read request when the physical address is included in the one or more host map segments;
   a memory device configured to store data or provide the stored data in response to a request from the host controller and store memory map segments including mapping information between the logical address provided with the request and a valid physical address in which data corresponding to the logical address is stored;
   a memory controller configured to search for the valid physical address in the memory map segments, based on the read request, the logical address corresponding to the read request, and a physical address selectively provided and corresponding to the logical address, to control the memory device to perform a read operation corresponding to the read request based on the valid physical address, and to provide some of the memory map segments to be cached in the host cache as the host map segments, based on a read count threshold indicating the number of receptions of the read request for the logical address in the memory map segment; and
   a memory configured to store the read count, a miss count indicating the number of receptions of the read request with no physical address, and a provision count indicating the number of times the memory map segment is cached in the host cache,
   wherein the memory controller adjusts the read count threshold based on the miss count and the provision count.

2. A memory system comprising:
   a memory device configured to store data or provide the stored data in response to requests from a host and store memory map segments including mapping information between a logical address provided with the requests and a valid physical address in which the data corresponding to the logical address is stored;
   a memory controller configured to search for the valid physical address from the memory map segments, based on a read request, the logical address corresponding to the read request, and a physical address selectively provided and corresponding to the logical address, and to control the memory device to perform a read operation corresponding to the read request based on the valid physical address, and to provide some of the memory map segments to be cached in the host as host map segments, based on a read count threshold indicating the number of receptions of the read request for the logical address in the memory map segment; and
   a memory configured to store the read count, a miss count indicating the number of receptions of the read request with no physical address, and a provision count indicating the number of times the memory map segment is cached in the host,
   wherein the memory controller adjusts the read count threshold based on the miss count and the provision count.

3. The memory system of claim 2, wherein, when the provision count is less than a provision count threshold and the miss count is greater than or equal to a miss count threshold, the memory controller decreases the read count threshold.

4. The memory system of claim 3, wherein, when the provision count is less than the provision count threshold and the miss count is less than the miss count threshold, the memory controller increases the read count threshold.

5. The memory system of claim 4, wherein, when the read count threshold does not exceed a set upper limit, the memory controller increases the read count threshold.

6. The memory system of claim 2, wherein the memory controller periodically adjusts the read count threshold based on the provision count and the miss count.

7. The memory system of claim 2, wherein the memory controller periodically decreases the read count a set percentage.

8. The memory system of claim 2, wherein the memory controller caches some of the memory map segments in the host as the host map segments and provides a response to the host in response to the request of the host.

9. The memory system of claim 2, wherein the memory controller provides a remove signal for a host map segment having the read count less than the read count threshold among the host map segments and provides a response to the host in response to the request of the host.

10. The memory system of claim 2, wherein, when the physical address selectively provided is not the valid physical address, the memory controller searches for a valid physical address corresponding to the logical address from the memory map segments.

11. The memory system of claim 10, wherein the memory further stores information indicating whether the host map segment has been changed, and the memory controller determines, based on the information whether the physical address selectively provided is the valid physical address.

12. An operation method of a memory system, comprising:

searching for a valid physical address, at which data corresponding to a logical address is stored, in memory map segments stored in the memory system, based on a read request from a host, a logical address corresponding to the read request, and a physical address selectively provided and corresponding to the logical address and performing a read operation corresponding to the read request;

caching some of the memory map segments in the host as host map segments based on a read count threshold indicating the number of receptions of the read request for the logical address in the memory map segment; and adjusting the read count threshold based on a miss count indicating the number of receptions of the read request with no physical address, and a provision count indicating the number of times the memory map segment is cached in the host.

13. The operation method of claim 12, wherein the adjusting of the read count threshold comprises:

decreasing the read count threshold when the provision count is less than a provision count threshold and the miss count is greater than or equal to a miss count threshold.

14. The operation method of claim 13, wherein the adjusting of the read count threshold comprises:

increasing the read count threshold when the provision count is less than the provision count threshold and the miss count is less than the miss count threshold.

15. The operation method of claim 14, wherein the adjusting of the read count threshold comprises:

increasing the read count threshold when it does not exceed a set upper limit.

16. The operation method of claim 12, further comprising:

periodically adjusting the read count threshold based on the provision count and the miss count.

17. The operation method of claim 12, further comprising:

periodically decreasing the read count a set percentage.

18. The operation method of claim 12, wherein the caching of some of the memory map segments in the host as the host map segments comprises:

caching some of the memory map segments in the host as the host map segments and provide a response to the host in response to the request of the host.

19. The operation method of claim 12, further comprising:

providing a remove signal for a host map segment having a read count less than the read count threshold among the host map segments and provide a response to the host in response to the request of the host.

20. The operation method of claim 12, further comprising:

searching for the valid physical address corresponding to the logical address in the memory map segments, based on the read request, the logical address corresponding to the read request, and the physical address selectively provided and corresponding to the logical address, and performing the read operation corresponding to the read request; and searching for the valid physical address corresponding to the logical address in the memory map segments when the physical address selectively provided is not the valid physical address.

* * * * *